US012686506B2

(12) United States Patent
Kim et al.

(10) Patent No.: US 12,686,506 B2
(45) Date of Patent: Jul. 21, 2026

(54) SYSTEM AND METHOD FOR LOADING AND UNLOADING CARGO

(71) Applicants: Hyundai Motor Company, Seoul (KR); Kia Corporation, Seoul (KR)

(72) Inventors: Kye Yoon Kim, Gunpo-Si (KR); Choung Hyoung Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 236 days.

(21) Appl. No.: 18/388,510

(22) Filed: Nov. 9, 2023

(65) Prior Publication Data

US 2024/0375788 A1      Nov. 14, 2024

(30) Foreign Application Priority Data

May 10, 2023 (KR) ........................ 10-2023-0060645

(51) Int. Cl.
B64F 1/32 (2006.01)

(52) U.S. Cl.
CPC ..................................... B64F 1/32 (2013.01)

(58) Field of Classification Search
CPC .... B64D 2009/006; B64D 9/00; B64C 17/02; G01M 1/125
See application file for complete search history.

(56) References Cited

U.S. PATENT DOCUMENTS

| | | | | | |
|---|---|---|---|---|---|
| 5,257,756 | A | * | 11/1993 | Patzig | .................... G01G 19/07 |
| | | | | | 244/103 R |
| 8,185,234 | B2 | | 5/2012 | Tietjen et al. | |

| | | | | | |
|---|---|---|---|---|---|
| 9,550,561 | B1 | * | 1/2017 | Beckman | ................. G05D 3/00 |
| 10,196,146 | B2 | * | 2/2019 | Himmelmann | ........... B64C 1/22 |
| 10,543,905 | B1 | | 1/2020 | Kwon et al. | |
| 11,066,168 | B2 | | 7/2021 | Clos et al. | |
| 2001/0028018 | A1 | | 10/2001 | Darbyshire | |
| 2005/0001579 | A1 | | 1/2005 | Touzov | |
| 2014/0377017 | A1 | * | 12/2014 | Panzram | ............. B65D 88/127 |
| | | | | | 406/88 |

(Continued)

FOREIGN PATENT DOCUMENTS

| | | |
|---|---|---|
| CN | 212206317 U | 12/2020 |
| CN | 113492982 A | 10/2021 |
| EP | 3006338 B1 | 12/2018 |

(Continued)

OTHER PUBLICATIONS

Apr. 5, 2024—(EP) European Search Report—App 23207897.2.

*Primary Examiner* — Joshua D Huson
*Assistant Examiner* — Anna L. Gordon
(74) *Attorney, Agent, or Firm* — Banner & Witcoff, Ltd.

(57) ABSTRACT

The present disclosure relates to a system and a method for loading and unloading a cargo that can measure a change and distribution of load, learn an optimal center of gravity, and ensure control stability by easily adjusting the center of gravity and maintaining balance in an aircraft. The system for loading and unloading a cargo may include: a sensing unit configured to measure a total weight of the aircraft and a load of a loaded cargo; a controller configured to calculate a center of gravity of the aircraft using information obtained by the sensing unit; and a device for adjusting a center of gravity operated under control of the controller and configured to move a position of the cargo in the cargo hold.

13 Claims, 6 Drawing Sheets

(56)       References Cited

U.S. PATENT DOCUMENTS

| | | | | |
|---|---|---|---|---|
| 2019/0202561 A1* | 7/2019 | Weekes | ................. | B64U 30/20 |
| 2021/0309354 A1 | 10/2021 | Parker et al. | | |

FOREIGN PATENT DOCUMENTS

| | | | | |
|---|---|---|---|---|
| EP | 3594113 A1 | 1/2020 | | |
| JP | 2003-527272 A | 9/2003 | | |
| JP | 2019-142441 A | 8/2019 | | |
| KR | 10-2001-0058824 A | 7/2001 | | |
| KR | 100950253 B1 | 3/2010 | | |
| WO | WO-2008091287 A2 * | 7/2008 | ............ | B65G 69/24 |

* cited by examiner

SYSTEM AND METHOD FOR LOADING AND UNLOADING CARGO

CROSS-REFERENCE TO RELATED APPLICATION(S)

This application claims benefit of priority to Korean Patent Application No. 10-2023-0060645 filed on May 10, 2023, in the Korean Intellectual Property Office, the disclosure of which is incorporated herein by reference in its entirety.

TECHNICAL FIELD

The present disclosure relates to a system and/or a method for loading and unloading cargo. The system and/or method can measure a change and/or distribution of a load, learn an optimal center of gravity, and/or ensure control stability by easily adjusting the center of gravity and maintaining balance, for example, in an aircraft.

BACKGROUND

If cargo is mounted in a vehicle (e.g., an aircraft), a center of gravity of the vehicle (e.g., aircraft) is shifted by the center of gravity of the cargo. Matching these centers of gravity is essential for efficient and safe flight.

For example, particularly in a case where an aircraft has to travel quickly to several places, making several stops over relatively short distances to load and unload various cargo, the center of gravity of the aircraft with the changing cargo may be adjusted depending on a load changed after unloading and/or loading the cargo at the various (e.g., intermediate) stops.

Loads applied to landing gears may be measured and used to find the center of gravity of an aircraft. Also, or alternatively, the center of gravity may be estimated using calculations according to the load and position of fuel, cargo, and/or passengers. Subsequently, the cargo may be (re)distributed in cargo hold so that the center of gravity of the aircraft is disposed within an allowable tolerance range.

Adjusting and readjusting the distribution of the cargo may add time to loading or unloading the cargo. Accordingly, there may be a problem in achieving efficient and safe flight.

SUMMARY

The following summary presents a simplified summary of certain features. The summary is not an extensive overview and is not intended to identify key or critical elements.

Systems, apparatuses, and methods are described for loading and unloading cargo. A system for loading and unloading cargo, in an aircraft comprising a cargo hold, may comprise a sensor configured to measure a total weight of the aircraft and a loaded cargo; a controller configured to calculate, based on information from the sensor, a center of gravity of the aircraft; and a device configured to adjust, based on control information received from the controller, the center of gravity by moving a position of the cargo in the cargo hold.

A method may comprise receiving total weight information of an aircraft comprising a movable plate in a cargo hold thereof, and calculating an actual center of gravity of the aircraft based on the measured total weight information; determining a preset center of gravity tolerance range based on the measured total weight; comparing the actual center of gravity with the center of gravity tolerance range to determine whether the actual center of gravity is within the center of gravity tolerance range; and based on determining that the actual center of gravity is not within the center of gravity tolerance range, causing a position of the movable plate to move.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
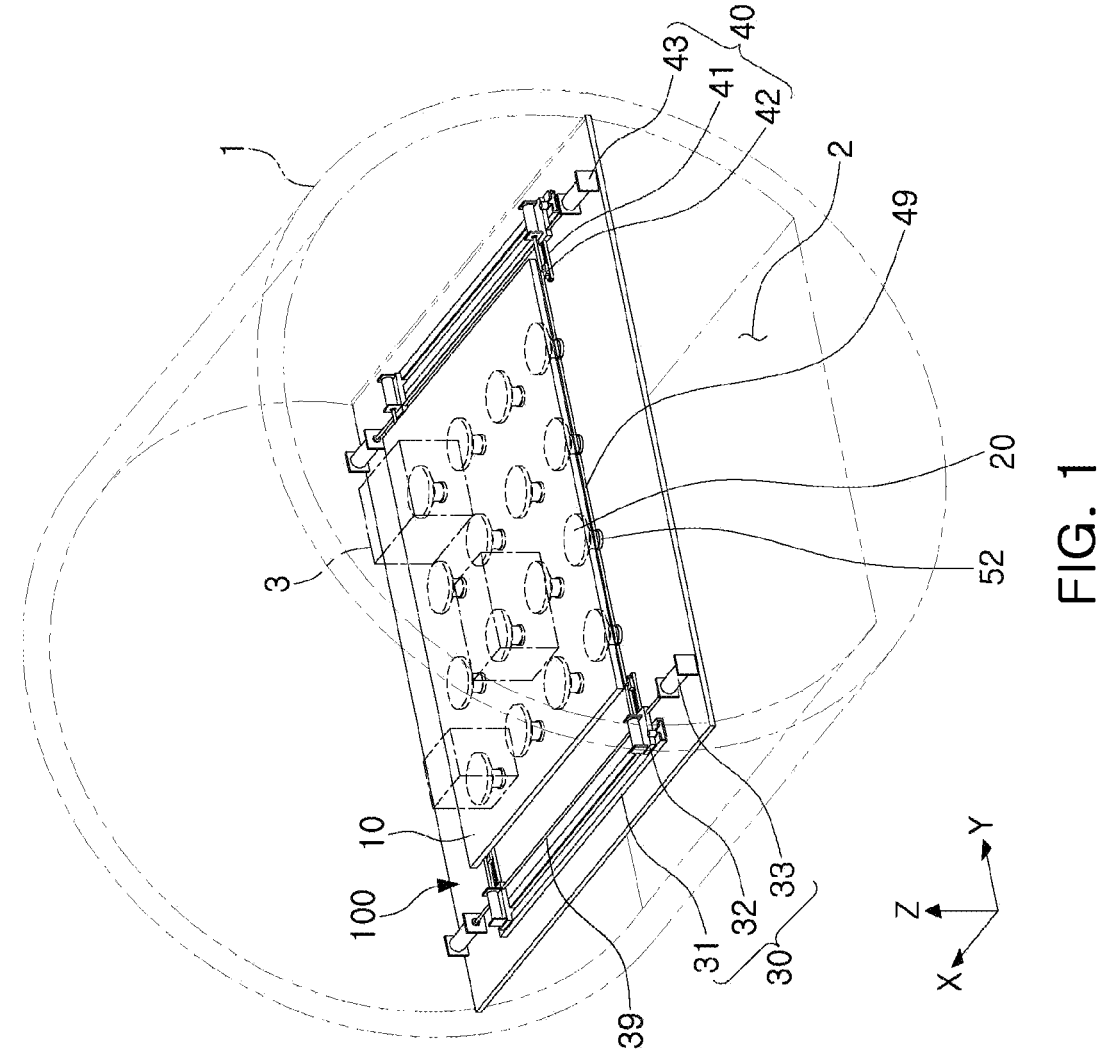
FIG. 1 is a perspective view illustrating a device for adjusting a center of gravity according to the present disclosure.

Hereinafter, the present disclosure will be described in detail with reference to the accompanying drawings. In adding reference numerals to elements of each of the drawings, like reference numerals will refer to like elements.

In the present specification, an aircraft may refer to a mobility vehicle configured to fly and/or move through the air. The aircraft may refer to a rotorcraft, a drone, a tilt rotor aircraft, a vertical take-off and landing aircraft, a fixed-wing aircraft, and the like. The aircraft may also, or alternatively, include a vehicle that may land on the ground and/or at an apron using landing gear. The aircraft may also, or alternatively, include a manned aircraft or an unmanned aircraft. The aircraft may include a fuselage. The fuselage may be able to be operated by autonomous control and/or manned control (e.g., by a pilot).

For convenience of explanation, the present disclosure describes an example applied to an aircraft comprising a cargo hold, but the present disclosure is not necessarily limited thereto. The present disclosure may be applied to a land mobility vehicle, a marine mobility vehicle, and/or any other mobile robot, such as an autonomous vehicle.

Terms such as "first," "second," "third,", "a," "b," "c," etc., may be used to describe various elements (e.g., to differentiate between like elements). These terms are not intended to limit the elements (e.g., based on order, size, position, and/or importance). These terms may be used for distinguishing one component from other components.

Detailed descriptions of elements that may be generally known in the relevant art may be omitted if such descriptions would obfuscate the present subject matter.

Figure 2:
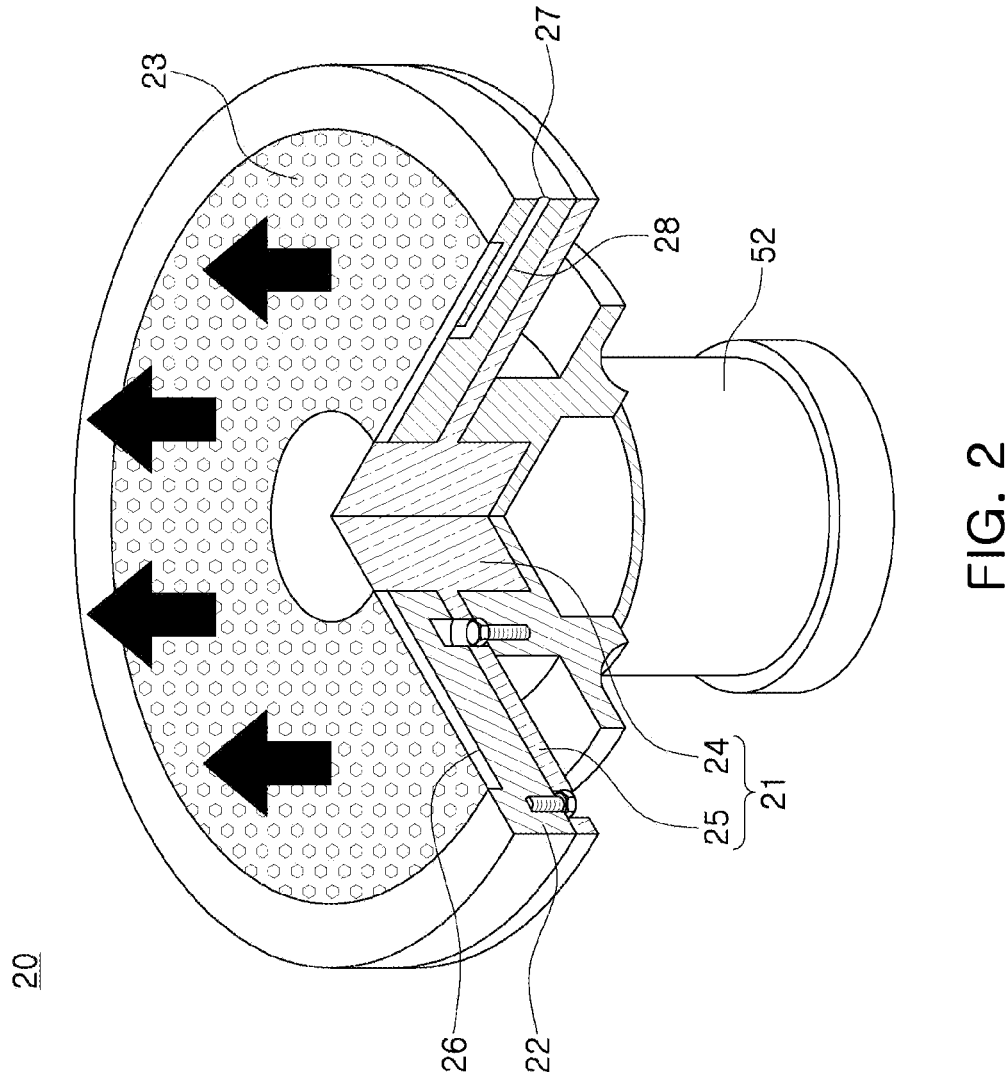
FIG. 2 is an enlarged perspective view illustrating an air bearing with a portion thereof cutaway.
Figure 3:
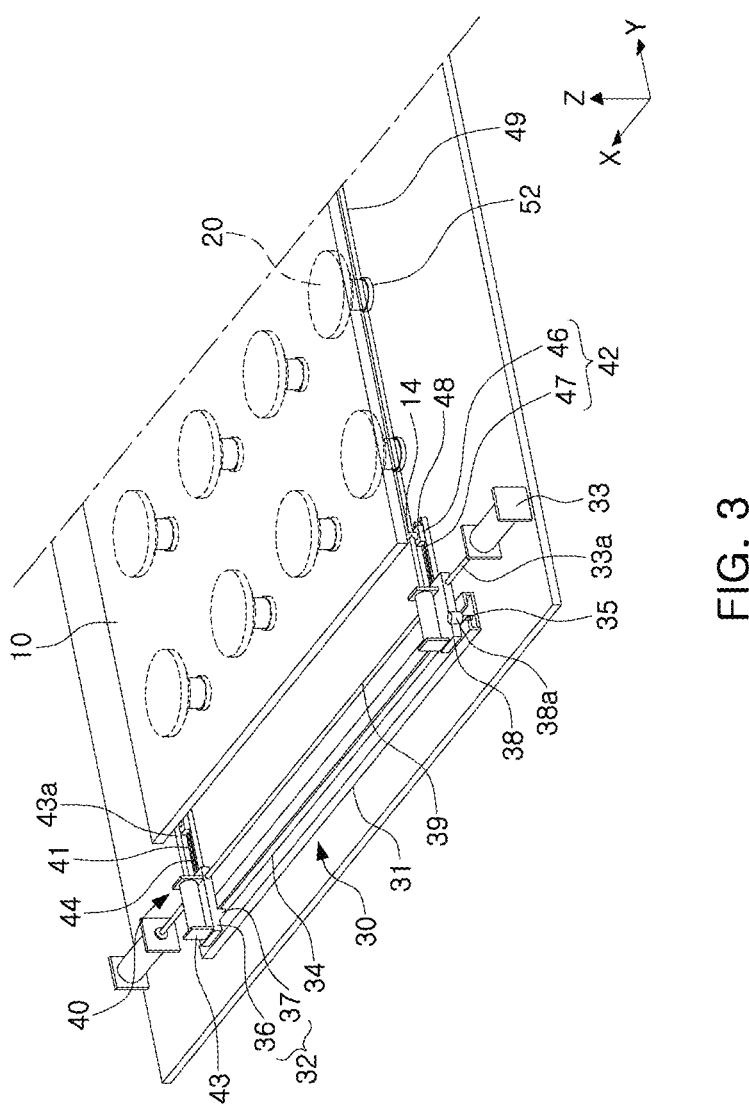
FIG. 3 is an enlarged perspective view illustrating a portion of a driver.

FIG. 1 is a perspective view illustrating a device for adjusting a center of gravity according to the present disclosure. FIG. 2 is an enlarged perspective view illustrating an air bearing with a portion thereof cutaway, and FIG. 3 is an enlarged perspective view illustrating a portion of a driver.

A device for adjusting a center of gravity 100 according to an example of the present disclosure may include a movable plate 10, a plurality of air bearings 20, and/or a first driver 30.

An aircraft 1 to which the device for adjusting a center of gravity 100 is applicable may comprise a cargo hold 2 for loading (e.g., holding, storing, and/or transporting) cargo 3. The cargo hold may be accessible from an access means (e.g., door, opening, etc.) of the aircraft (e.g., via at least one of a left side, a right side, a rear side, a front side, a top and/or a bottom of the aircraft). The cargo hold 2 may accommodate loaded cargo 3 (e.g., have a size and structure to accommodate various cargo 3).

For example, a door (not illustrated) may be provided on a side surface of the aircraft 1 to correspond to the cargo hold 2. Such a door may comprise a sliding door configured to be opened and closed in a longitudinal direction (e.g., an X-direction in the figures, a front-to-back direction, and/or along the side) of the aircraft. However, a shape of the door is not limited thereto, and a door that opens and closes vertically and/or a hinged door may be used.

The aircraft 1 may be equipped with a plurality of landing gears 5 and 6 in a lower portion thereof. the plurality of landing gears may be configured to support and/or move a fuselage of the aircraft on the ground and/or at an apron and/or another landing surface (e.g., water, etc.). For example, wheels may be adopted as landing gears, but the present disclosure not necessarily limited thereto. A first load sensor 51 (see FIG. 4) for measuring a total weight of the aircraft may be installed in each landing gear.

Furthermore, the aircraft 1 may include a plurality of wings and/or a plurality of rotors provided in and/or connected to the fuselage. For example, the plurality of rotors may be provided for vertical take-off and/or landing and/or vertical and/or horizontal flight of the aircraft.

The movable plate 10 may be a substantially plate-shaped member. The movable plate may be shaped and/or sized so as to be configured to be spaced apart from a bottom and/or one or more sidewalls of the cargo hold 2 (e.g., while in the cargo hold 2) of the aircraft 1. The movable plate may be installed and/or configured to move and/or be moved in at least one of the longitudinal direction (X-direction) and/or a width direction (Y-direction) of the aircraft in the cargo hold 2.

The movable plate 10 may be made of, for example, a solid material such as metal, and may have a predetermined thickness and/or hardness/strength sufficient to support a load (e.g., a weight and/or a weight distribution) of the cargo 3.

In order to fix the cargo 3, one or more lashing grooves (not illustrated) in which lashing tools such as ropes, wires and/or chains may be installed may be formed and/or provided in the movable plate 10.

A plurality of air bearings 20 may be arranged between the movable plate 10 and the bottom of the cargo hold 2. The plurality of air bearings 20 may be configured to support and/or float the movable plate 10. Each of the plurality of air bearings 20 may include a mounting bracket 21, a support plate 22, and/or a porous plate 23.

The mounting bracket 21 may be configured to support components of the air bearing 20. The mounting bracket 21 may include a pillar portion 24 (e.g., a pillar) and/or a flange 25 radially extending from the pillar portion 24.

The mounting bracket 21 may be coupled to a second load sensor 52. Specifically, the mounting bracket 21 may form an integrated assembly by connecting the support plate 22 to the second load sensor 52. For example, the flange 25 may be coupled to the second load sensor 52 by a bolt.

Load cells may be adopted as the second load sensor 52, but the present disclosure is not necessarily limited thereto. This second load sensor 52 may be disposed between the movable plate 10 and the bottom of the cargo hold 2 and/or between the mounting bracket 21 of the air bearing 20 and the bottom of the cargo hold 2. The second load sensor 52 may be configured to directly measure and/or recognize the load of the cargo 3 on the movable plate. Furthermore, the load of the cargo 3 may be monitored in real time by the second load sensor 52.

The support plate 22 may have a predetermined thickness, and/or may be formed as a ring-shaped disk in a center of which a hole may be formed through which the pillar portion 24 of the mounting bracket 21 may penetrate. The support plate 22 may be coupled to the mounting bracket 21. A seating groove 26 into which the porous plate 23 may be inserted may be formed on an upper surface of the support plate 22.

The support plate 22 may comprise an air inlet 27 configured to provide air (e.g., compressed air) into the support plate 22 (e.g., through a side surface thereof via a tube (not illustrated) connected to an air compressor (not illustrated)). An air flow path 28 for allowing air introduced through the air inlet 27 to flow into the seating groove 26 (e.g., a tube, space, void, etc., that opens into the seating groove 26) may be formed and/or provided inside the support plate 22.

As the support plate 22 forms an uppermost end of the air bearing 20, the support plate 22 can be in contact with the movable plate 10 and may act as a portion of the air bearing that actually supports the movable plate.

The porous plate 23 may be inserted into, formed in, and/or mounted in the seating groove 26 of the support plate 22. The porous plate may be formed as a ring-shaped disk comprising a central hole through which the pillar portion 24 of the mounting bracket 21 is configured to penetrate, while having a plurality of holes (e.g., with a regular structure or an irregular structure).

The porous plate 23 may be configured to form an air film having a predetermined pressure on the upper surface of the air bearing if air is supplied through the air flow path 28 formed on the support plate 22. for example, the porous plate 23 may be configured to cause air to be substantially uniformly sprayed throughout an entire upper surface of the air bearing 20.

Accordingly, in a state in which the support plate 22 of the air bearing 20 is in contact with the movable plate 10 (e.g., to support the movable plate 10), if the movable plate needs to be moved to adjust the center of gravity of the aircraft 1 (e.g., by adjusting a center of gravity of the cargo 3, the air bearing 20 may receive compressed air to spray air having a predetermined pressure through the porous plate 23 and distribute air pressure, thus floating the movable plate 10 from the support plate 22 (e.g., by a predetermined height).

Floating the movable plate may be reduce friction resistance experienced by the movable plate 10 (e.g., there may be negligible friction between the movable plate 10 and the air bearing 20).

For example, approximately 15 or more air bearings 20 coupled to the second load sensor 52 may be provided between the movable plate 10 and the bottom of the cargo hold 2 and may be arranged at regular intervals (e.g., in a lattice).

Since an air compressor generating compressed air may be provided on the ground and/or at an apron, the air compressor may be connected to an air supply unit 7 (see FIG. 6, e.g., an air supply and/or air supply control/modulator) installed in the fuselage of the aircraft 1. The air supply unit 7 may have an electric valve (not illustrated) that may be opened and/or closed if electricity is applied thereto. Furthermore, tubes connected to each of the plurality of air bearings 20 may be branched and/or installed from the air supply unit 7 installed in the fuselage.

For example, if an aircraft 1 loads and/or unloads the cargo 3 at a departure point and/or an intermediate stop, the air compressor may be connected to the air supply unit 7 of the fuselage of the aircraft via a main tube, and then the compressed air generated by the air compressor may be supplied from the air supply unit 7 to the air bearing 20 through the tube to operate the air bearing. An air compressor and/or compressed air supply may also, or alternatively, be provided on the aircraft 1.

A regulator (not illustrated) for controlling the air pressure of the compressed air and/or supplying the air to the air bearing may be disposed between the air bearing 20 and the air supply unit 7 of the fuselage. Any regulator that can provide air pressure to float the movable plate 10 and the cargo 3 disposed thereon may be adopted.

The first driver 30 may be installed on the bottom of the cargo hold 2 to move the movable plate 10 in one or more of the longitudinal direction (X-direction) and/or the width direction (Y-direction) of the aircraft 1. To this end, a pair of first drivers 30 may be provided so that they may be disposed in at least two sides of the movable plate 10.

The first driver 30 may include a first rail 31, a first slider 32, and/or a first actuator 33.

The first rail 31 may extend and/or be disposed in a first direction from the bottom of the cargo hold 2. For example, the first direction may be parallel to the longitudinal direction (X-direction) of the aircraft 1 or the cargo hold 2. The first rail may be formed of a solid material such as metal and/or plastic. The first rail may include a groove portion 34 (e.g., a groove) formed to extend in the longitudinal direction of the first rail.

A plurality of locking holes 35 may be arranged to be spaced apart from each other at intervals in a longitudinal direction of the first rail 31. the plurality of locking holes 35 may be formed on a bottom and/or a sidewall of the groove portion 34.

The first rail 31 may serve to guide the movement of the movable plate 10 together with the first slider 32.

The first slider 32 may be inserted into an interior of the first rail 31 (e.g., into the groove portion 34 of the first rail 31). The first slider 31 may reciprocate and/or slide in the longitudinal direction of the first rail 31 (e.g., within the groove portion 34 of the first rail). Furthermore, the first slider 32 may be directly and/or indirectly connected to the movable plate 10.

The first slider 32 may have a cross-sectional shape corresponding to the groove portion 34 of the first rail 31. For example, the first slider 32 may be formed to have a substantially T-shaped and/or inverted L-shaped cross-section. Accordingly, the first slider 32 may include a mounting portion 36 (e.g., a flat mounting portion 36) and an insertion portion 37 connected to (e.g., orthogonal to) the mounting portion 36. The insertion portion 37 may be configured to be inserted into the groove portion 34.

A first locker 38 for controlling a movement of the first slider 32 may be mounted in a side of the mounting portion 36. A hydraulic cylinder (such as a pneumatic cylinder) or an electric actuator (such as a solenoid actuator), which may be equipped with an operating rod 38a, may be adopted as the first locker 38.

For example, the first locker 38 may be disposed so that an expansion (e.g., extension, protrusion and/or elongation) and/or contraction (e.g., retraction, shortening, etc.) direction of the operating rod 38a may be perpendicular to the movement direction of the first slider 32 and/or the longitudinal direction of the first rail 31.

If the operating rod 38a of the first locker 38 is expanded (e.g., extended), an end of the operating rod 38a may be inserted (e.g., protrude) into one of the locking holes 35 of the first rail 31, thus preventing movement (e.g., along the first rail 31) of the first slider 32. The operating rod 38a expanding to insert into the locking hole 35 may fixedly determine a position of the first slider 32 along the first rail 31. If the operating rod 38a is contracted (e.g., retracted, shortened, pulled out of and/or up to clear the locking hole 35), the first slider 32 may slide on (e.g., along) the first rail 31 without interference (e.g., by driving force of the first actuator 33).

Here, the configuration of the first locker 38 and an arrangement relationship of the first locker 38 and the locking hole 35 are not limited to the aforementioned example. Any other means of fixing and/or releasing the position of the first slider 32 on the first rail 31 may be considered and/or implemented.

An operating rod 33a of the first actuator 33 may be connected to the mounting portion 36. As the first actuator 33, a hydraulic cylinder (e.g., such as a pneumatic cylinder) or an electric actuator (e.g., such as a solenoid actuator), which may be equipped with the operating rod, may be adopted. Also, or alternatively, an electric linear actuator that can determine the position of the operating rod screw-fastened to a ball screw with high precision, by rotating the ball screw in a case using a stepping motor mounted in one side of the case may be adopted as the first actuator 33.

The movable plate 10 may be fixedly connected to another side of the mounting portion 36. For example, in order to implement stable support and movement of the movable plate 10, a plurality of first sliders 32 may be disposed and connected to a bottom of the movable plate 10.

A plurality of first actuators 33 may be provided. Each of the first actuators 33 may be connected to the first slider 32 so as to be configured to provide driving force. Expansion and/or contraction of the operating rods 33a may be coordinated. For example, in a case that the operating rods 33a are providing on opposing sides of the first slider 32, the expansion and/or contraction of the opposing operating rods 33a may be reversed and/or opposing from each other. That is, if the operating rod 33a of one first actuator 33 disposed on one side of the first slider 31 expands, the operating rod 33a of the other first actuator 33 disposed on the opposite side contracts.

The first driver 30 may further include a first connection member 39 for connecting the plurality of first sliders 32. The first connection member 39 may be formed of a substantially rod-shaped or tubular member. Accordingly, the plurality of first sliders 32 may simultaneously move along the first rail 31 in the same direction.

Accordingly, in a state in which the movable plate 10 is floated by a predetermined height from the air bearing 20, the first actuator 33 of the first driver 30 may operate to expand or contract the operating rod 33a, thus moving the movable plate 10 connected to the first slider 32 in the first direction along the first rail 31.

The movable plate 10 may be moved in the longitudinal direction (X-direction) of the aircraft 1, for example, within a range of ±300 mm, that is, a total range of 600 mm. To this end, the first rail 31 and the operating rod of the first actuator 33 may have a length of approximately 600 mm or more.

The device for adjusting a center of gravity 100 according to the present disclosure may further include a second driver 40 interposed between the movable plate 10 and the first driver 30 to move the movable plate 10 in one of the longitudinal direction (X-direction) and width direction (Y-direction) of the aircraft 1.

The second driver 40 may be disposed on the first slider 32 of the first driver 30, and between the first slider 32 and the movable plate 10. Furthermore, a pair of second drivers 40 may be provided so that they may be disposed in both sides of the movable plate 10.

The second driver 40 may include a second rail 41, a second slider 42, and a second actuator 43.

The second rail 41 may be connected to the other side of the mounting portion 36 of the first slider 32 in a cantilever shape, and may extend and be disposed in a second direction. For example, the second direction may be parallel to the width direction (Y-direction) of the aircraft 1 or the cargo hold 2. The second rail 41 may be formed of a solid material such as metal or plastic. The second rail 41 may include a groove portion 44 formed to extend in a longitudinal direction of the second rail 41.

A plurality of locking holes (not illustrated) arranged to be spaced apart from each other at intervals in the longitudinal direction of the second rail 41 may be formed on a bottom or one sidewall of the groove portion 44.

The second rail 41 may be configured to guide the movement of the movable plate 10 (e.g., together with a plurality of second sliders 42.

The second slider 42 may be inserted into an interior of the second rail 41 (e.g., a groove portion 44 of the second rail 41). The second slider 42 may reciprocate and/or slide in the longitudinal direction of the second rail 41 within the groove portion 44 of the second rail 41. The second slider 42 may be directly or indirectly connected to the movable plate 10.

The second slider 42 may have a cross-sectional shape corresponding to the groove portion 44 of the second rail 41. For example, the second slider 42 may be formed to have a substantially T or L-shaped cross-section. Accordingly, the second slider 42 may include a flat mounting portion 46 and an insertion portion 47 connected thereto (e.g., to be orthogonal to the mounting portion 46). The insertion portion may be configured to be inserted into the groove portion 44.

A second locker 48 for controlling a movement of the second slider 42 may be mounted in one side of the mounting portion 46. As the second locker, a hydraulic cylinder such as a pneumatic cylinder, or an electric actuator such as a solenoid actuator, which is equipped with the operating rod, may be adopted.

For example, the second locker 48 may be disposed so that the expansion and contraction direction of the operating rod may be perpendicular to the movement direction of the second slider 42 and the longitudinal direction of the second rail 41.

If the operating rod of the second locker 48 is expanded, an end of the operating rod may be inserted into (e.g., extend into) a locking hole of the second rail 41 (e.g., one of a plurality of locking holes, not shown, of the second rail 41), thus preventing the movement of the second slider 42 along the second rail 41 (e.g., fixedly determining a position of the second slider 42 along the second rail 41). If the operating rod is contracted (e.g., to no longer be inserted into the locking hole of the second rail 41), the second slider 42 may be able to slide on the second rail 41 without interference (e.g., slide based on driving force provided by the second actuator 43).

Here, the configuration of the second locker 48 and an arrangement relationship between the second locker 48 and the locking hole are not limited to the aforementioned example. If the position of the second slider 42 on the second rail 41 may be fixed or the fixing thereof may be released, disclosure may have any other configuration and an appropriate arrangement relationship therebetween.

The operating rod 43a of the second actuator 43 may be connected to the mounting portion 46 via a support portion 14 or directly. As the second actuator, a hydraulic cylinder such as a pneumatic cylinder, or an electric actuator such as a solenoid actuator, which is equipped with the operating rod, may be adopted. Alternatively, an electric linear actuator that can determine the position of the operating rod screw-fastened to a ball screw with high precision, by rotating the ball screw in a case using a stepping motor mounted on one side of the case may be adopted as the second actuator 43.

Furthermore, the mounting portion 46 of the second slider 42 and the movable plate 10 may be fixedly connected through the support portion 14. To this end, welding or bolting may perform a connection between the support portion 14 and the mounting portion 46 and a connection between the support portion 14 and the movable plate 10.

When the support portion 14 is provided, the operating rod 43a of the second actuator 43 may be connected to the support portion 14. The welding or the bolting may perform a connection between the support portion 14 and the operating rod 43a of the second actuator 43.

For example, in order to implement stable support and movement of the movable plate 10, a plurality of second sliders 42 may be connected to the bottom of the movable plate 10 through the support portion 14.

In this case, the device for adjusting a center of gravity 100 of the present disclosure may include a plurality of first drivers 30, and each of the plurality of first drivers may include the second driver 40. Each of the second drivers 40 disposed in one side of the movable plate 10 may be equipped with the second actuator 43, and the second actuator may provide driving force to the second slider 42 connected to the movable plate 10.

In a plurality of second actuators 43 disposed in one side of the movable plate 10, expansion and contraction of the operation rods 43a disposed on both sides may be reversed. That is, when the operating rod of one second actuator disposed on one side expands, the operating rod of the other second actuator disposed on the opposite side contracts.

The device for adjusting a center of gravity 100 of the present disclosure may further include a second connection member 49 for connecting the plurality of second sliders 42 disposed on one side of the movable plate 10. The second connection member 49 may be formed of a substantially rod-shaped or tubular member. Accordingly, the plurality of second sliders 42 may simultaneously move along the second rail 41 in the same direction.

Accordingly, in a state in which the movable plate 10 is floated by a predetermined height from the air bearing 20, the second actuator 43 of the second driver 40 may operate to expand or contract the operating rod 43a, thus moving the movable plate 10 connected to the second slider 42 in the second direction along the second rail 41.

The movable plate 10 may be moved in the width direction (Y-direction) of the aircraft 1, for example, within a range of ±120 mm, that is, a total range of 240 mm. To this end, the second rail 41 and the operating rod 43*a* of the second actuator 43 may have a length of approximately 240 mm or more.

Hereinafter, an operation of the device for adjusting a center of gravity 100 according to the present disclosure will be briefly described.

When the position of the cargo 3 needs to be moved, an electric valve of the air supply unit 7 may be opened to drive the air bearing 20, thus supplying compressed air generated by the air compressor from the air supply unit to the air bearing 20 through the tube.

By spraying air having a predetermined pressure through the porous plate 23 of the air bearing 20, the movable plate 10 may be floated by a predetermined height from the support plate 22 of the air bearing 20. Air pressure for floating the movable plate 10 may be adjusted using a regulator. Accordingly, there may be no friction resistance between the movable plate 10 and the air bearing 20, or the friction resistance may be minimized.

In this state, the first locker 38 of the first driver may be released, and the first slider 32 may slide along the first rail 31 in the first direction by a predetermined amount of movement without interference (e.g., be free to slide along the first rail 41 based on the driving force provided by the first actuator 33).

When the second driver 40 is provided, the second driver 40 and the movable plate 10 connected thereto may also move in the first direction along the first rail 31 together with the movement of the first slider 32.

When the first locker 38 of the first driver 30 is operated after the movement of the first slider 32 is completed, the position of the first slider 32 with respect to the first rail 31 may be fixed. Accordingly, the position of the movable plate 10 and the cargo 3 disposed thereon may be moved and changed in the first direction.

In this state, when the second driver 40 is provided, the second locker 48 of the second driver 40 may be released, and the second slider 42 may slide along the second rail 41 in the second direction by a predetermined amount of movement without interference by the driving force of the second actuator 43.

The movable plate 10 may also, or alternatively, move in the second direction along the second rail 41 based on (e.g., together with) the movement of the second slider 42.

If the second locker 48 of the second driver 40 is operated (e.g., after the movement of the second slider 42 is completed), the position of the second slider 42 with respect to the second rail 41 may be fixed. Accordingly, the position of the movable plate 10 and the cargo 3 disposed thereon may be moved and changed in the second direction.

The device for adjusting a center of gravity 100, according to the present disclosure, may allow for moving (e.g., adjusting, controlling, changing) the position of the movable plate 10 in one or more directions (e.g., in the longitudinal direction (X-direction) and/or the width direction (Y-direction) of the aircraft 1). The present device allows the position of the cargo 3 to be quickly and easily adjusted by movement of the movable plate 10.

Also, or alternatively, the load (e.g., the weight, the weight distribution, the weight distribution within the aircraft 1, etc.) of the cargo 3 may be measured (e.g., in real-time and/or near real-time), and the measured load may be used to accurately adjust the center of gravity. The movement of the movable plate, floated by the air bearings, based on (e.g., due to and/or driven by) the driver (e.g., one or more of the first driver(s) 30 and/or the second driver(s) 40) in the cargo hold 2 may enable detailed adjustment of the position of the cargo.

Furthermore, according to the device for adjusting a center of gravity according to the present disclosure, cargo 3 of various shapes and sizes may be loaded in the cargo hold 2, and a high degree of freedom may be assigned to the location selection of each item of cargo 3.

Furthermore, according to the device for adjusting a center of gravity according to the present disclosure, after setting a position of initial cargo 3, the center of gravity may be automatically adjusted at intermediate stops, thereby reducing transportation time of the cargo 3.

Figure 4:
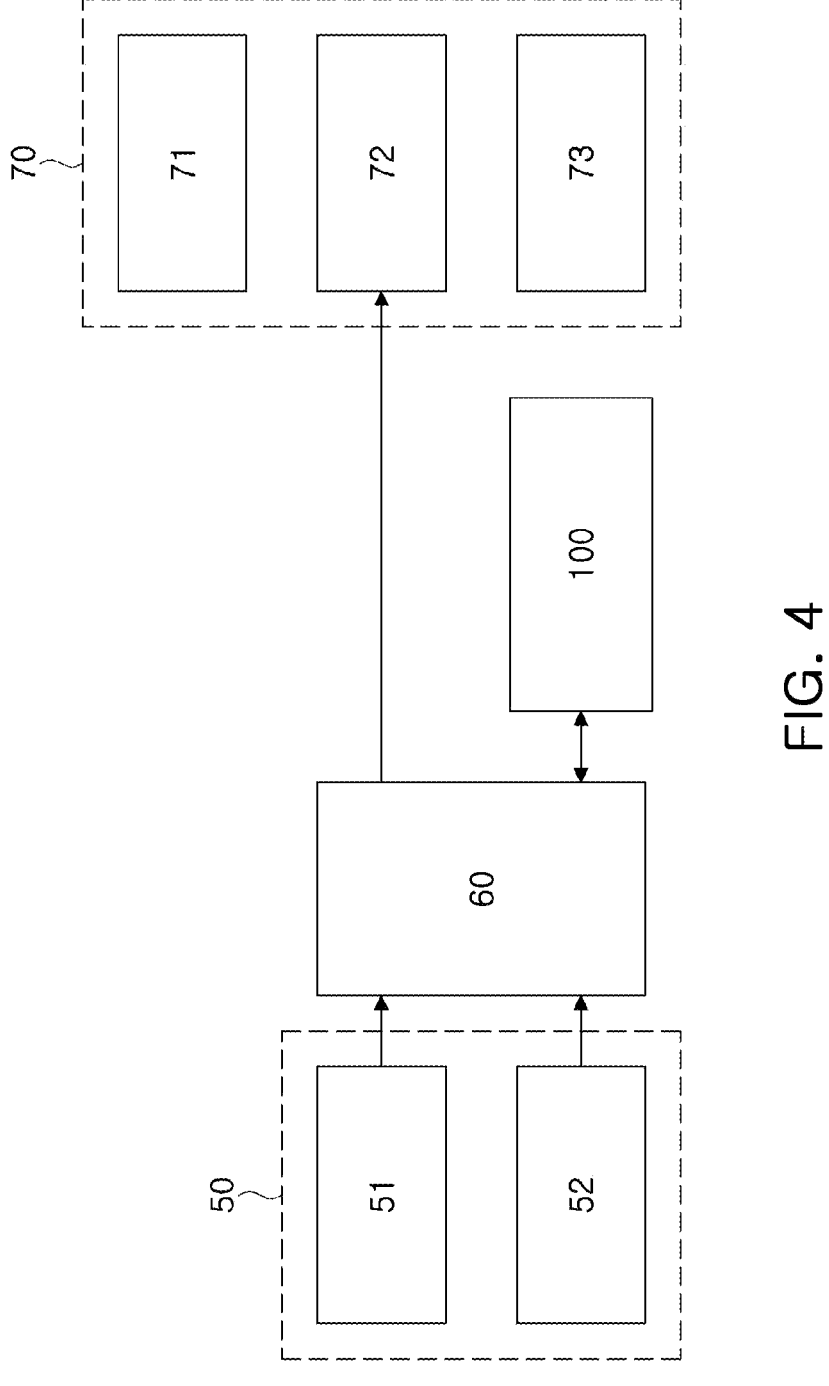
FIG. 4 is a schematic block diagram illustrating a system for loading and unloading cargo using the device for adjusting a center of gravity according to the present disclosure.

FIG. 4 is a schematic block diagram illustrating a system for loading and unloading cargo 3 using the device for adjusting a center of gravity according to the present disclosure.

The system for loading and unloading cargo according to the present disclosure may include a sensing unit 50 (e.g., sensor), a controller 60, and a device for adjusting a center of gravity 100.

The sensing unit 50 may include a first load sensor 51 installed in landing gears 5 and 6 to measure a total weight of the aircraft 1, and a second load sensor 52 disposed between the movable plate 10 of the device for adjusting a center of gravity 100 and the bottom of the cargo hold 2 to measure the load of the cargo 3. The sensing unit 50 may be electrically connected to the controller 60 using wired communication, wireless communication, or wired and wireless communication.

The first load sensor 51 may measure a vertical load applied to the landing gears 5 and 6, and may provide information for measuring the total weight of the aircraft 1 and calculating a position of the center of gravity, to the controller 60.

Here, the total weight of the aircraft 1 refers to the sum of a weight of passengers and a weight of the cargo 3, along with the weight of the aircraft.

The first load sensor 51 for measuring the total weight of the aircraft 1 may be installed in a nose landing gear 5 disposed in the front of the aircraft 1, and a main landing gear 6 disposed in the middle of the aircraft, respectively. The first load sensor may measure a load applied by being distributed to the nose landing gear and the main landing gear, thus obtaining the total weight of the aircraft 1 by performing calculation by the controller 60.

A load cell may be adopted as the first load sensor 51, but the present disclosure is not necessarily limited thereto, and at least one of any pressure sensor, any acceleration sensor, and any displacement sensor may be adopted as long as they are installed in the landing gears 5 and 6 to measure the total weight of the aircraft 1.

As described above, the second load sensor 52 may be provided between the movable plate 10 and the bottom of the cargo hold 2, thereby directly measuring and recognizing the weight of the cargo 3 disposed on the movable plate 10, that is, the load of the cargo 3.

The second load sensor 52 may be coupled to the mounting bracket 21 of the air bearing 20 to form an assembly integrated with the air bearing, but the present disclosure is not necessarily limited thereto.

The controller 60 may calculate and compare the center of gravity of the aircraft 1 using information obtained from the sensing unit 50, and control an operation of the device for adjusting a center of gravity 100 to adjust the center of gravity.

The controller 60 may be implemented with various processing devices, (e.g., a microprocessor in which a semiconductor chip and/or a memory capable of storing instructions for performing various operations and/or executing instructions is embedded. Furthermore, one or more programs (e.g., instructions) for performing various operations may be stored (e.g., in a memory of the controller 60). A non-transitory computer readable medium may comprise instructions for performing and/or causing one or more devices to perform the various operations (e.g., for causing the controller 60 to perform various operations described herein) Based on the program, for example, a center of gravity tolerance range and the actual center of gravity of the aircraft 1 may be calculated and/or compared to determine whether the actual center of gravity is within the center of gravity tolerance range.

If the total weight of the aircraft 1 changes, especially if the weight of the cargo 3 changes due to the loading and/or unloading of the cargo 3, the controller 60 may measure the total weight of the aircraft 1 based on the information obtained from the first load sensor 51. Furthermore, based on total weight information, the controller 60 may assume density based on a (e.g., previously input) shape of the aircraft, and may define corresponding coordinates by calculating the actual center of gravity.

The controller 60 may determine (e.g., receive, retrieve from a memory, and/or calculate) a center of gravity tolerance range for each aircraft with respect to the measured total weight of the aircraft. The preset tolerance range may be based on input data defining the tolerance range, may be based on safety allowances, etc. The controller 60 may compare the actual center of gravity with a determined center of gravity tolerance range, thus determining whether the actual center of gravity is within a corresponding center of gravity tolerance range. As a result of the determination, if the actual center of gravity is within the center of gravity tolerance range, the controller 60 may provide information of the center of gravity to an upper control system 70 of the aircraft 1. The upper control system may be a control system and/or device implemented via one or more devices (e.g., a computing system, computer, computing device, etc.) comprising one or more processors and a memory for storing instructions to be executed by the one or more processors to cause one or more steps described herein.

If the actual center of gravity deviates from the center of gravity tolerance range, it may be determined to move the position of the cargo 3. The controller 60 may measure a load (e.g., a weight, weight distribution, weight position) caused the cargo 3 (e.g., based on and/or after loading, unloading, moving and/or shifting and/or changing the cargo 3). The controller may measure the load using the information obtained via the second load sensor 52. The controller may calculate and/or determine a volume of the cargo based on an input and/or received cargo size and/or one or more dimensions. Accordingly, based on the measured load distribution of the cargo 3, the controller 60 may calculate and/or determine an amount of movement of the cargo 3 so that the actual center of gravity can be moved within the center of gravity tolerance range.

The example described and illustrated with reference to FIGS. 1 to 3 may be adopted as the device for adjusting a center of gravity 100.

For example, approximately 15 or more air bearings 20 coupled to the second load sensor 52 may be provided between the movable plate 10 and the bottom of the cargo hold 2 and may be arranged at regular intervals.

The first driver 30 may be provided in pairs (e.g., opposing pairs), and the second driver 40 may be provided in pairs (e.g., one second driver 40 for each of the first drivers 30), thereby stably supporting and smoothly moving the movable plate 10 and the cargo 3.

The controller 60 may be communicatively connected to the first actuator 33, the first locker 38, the second actuator 43, the second locker 48, and/or the electric valve of the air supply unit 7 (e.g., air supply and/or air supply controller) in the device for adjusting a center of gravity 100. The controller 60 may be configured to communicate with any one or more of the above components using wired communication, wireless communication, or wired and wireless communication, and may control their operation.

If the actual center of gravity of the aircraft is confirmed to deviate from the center of gravity tolerance range (e.g., if it is determined that the actual center of gravity is not within the center of gravity tolerance range), the controller 60 may control, via the communication, the electric valve of the air supply unit 7 and/or the air compressor to drive the air bearing 20 of the device for adjusting a center of gravity 100. Accordingly, air of a predetermined pressure may be sprayed through the porous plate 23 of the air bearing, thereby floating the movable plate 10 (e.g., by a predetermined height) from the support plate 22 of the air bearing.

Then, the controller 60 may control an operation of the first actuator 33 and/or the second actuator 43 so as to move the position of the movable plate 10 by a determined amount of movement by driving the first driver 30 and/or the second driver 40. Accordingly, the position of the movable plate 10 may be moved in the longitudinal direction (X-direction) and/or the width direction (Y-direction) of the aircraft 1, and the position of the cargo 3 may be adjusted due to the movement of the movable plate 10.

Furthermore, the controller 60 may store (e.g., repeatedly accumulate and/or store) and/or update the calculated center of gravity of the aircraft 1 and/or the amount of movement of the movable plate 10 for matching the center of gravity. The controller 60 may learn the center of gravity of the aircraft 1 and/or the amount of movement of the movable plate 10 based on the load and the arrangement of the cargo 3. For example, the controller 60 may learn the center of gravity of the aircraft 1 based on repeated measurements of the actual center of gravity of the aircraft and of the center of gravity of the cargo, and storing/updating the repeated measurements.

The controller 60 may be merged with and/or linked to the upper control system 70 of the aircraft 1. For example, along with various flight control units, the upper control system 70 may include a position measurement unit 71, a data storage 72 (e.g., a hard drive or a flash memory), and a communication unit 73, thereby controlling an operation of several components required for the flight of an aircraft.

The position measurement unit 71 may measure the position of the aircraft 1 through reception of a global positioning system (GPS) signal from a satellite or sensing of an inertial navigation system (IMS), and may transmit the measured position information to the data storage 72.

The data storage 72 may store and/or maintain various types of data collected from inside and/or outside the aircraft 1 (e.g., in the form of a database). The database may refer to an organization of related data regardless of how to express the data (e.g., tables, maps, grids, packets, diagrams, files, and/or messages).

The data storage 72 may store various data required for calculating the center of gravity, such as the weight and the shape of the aircraft 1, the number of passengers, and the size and the number of cargo 3, as well as input or preset flight-related information, and the total weight of the aircraft, the load of the cargo 3, the center of gravity, which are calculated based on these data, and the preset center of gravity tolerance range of the total weight.

Accordingly, the system for loading and unloading cargo 3 according to the present disclosure may adjust the center of gravity by moving the position of the cargo 3 according to the load and the arrangement, thereby optimizing the control stability of the aircraft.

The communication unit 73 may be accessible, using, for example, at least one of wired communication, wireless communication, and wired and wireless communication. The upper control system 70 may communicate with and control various components in the aircraft 1 using wireless communication, such as a communication network using a controller area network (CAN) protocol.

For example, the communication unit 73 may communicate with an interface of a user outside the aircraft 1, which may enable the user to monitor various data required for calculating the center of gravity, and the total weight of the aircraft, the load of cargo and the center of gravity, which are calculated based on these data, in real time.

Figure 5:
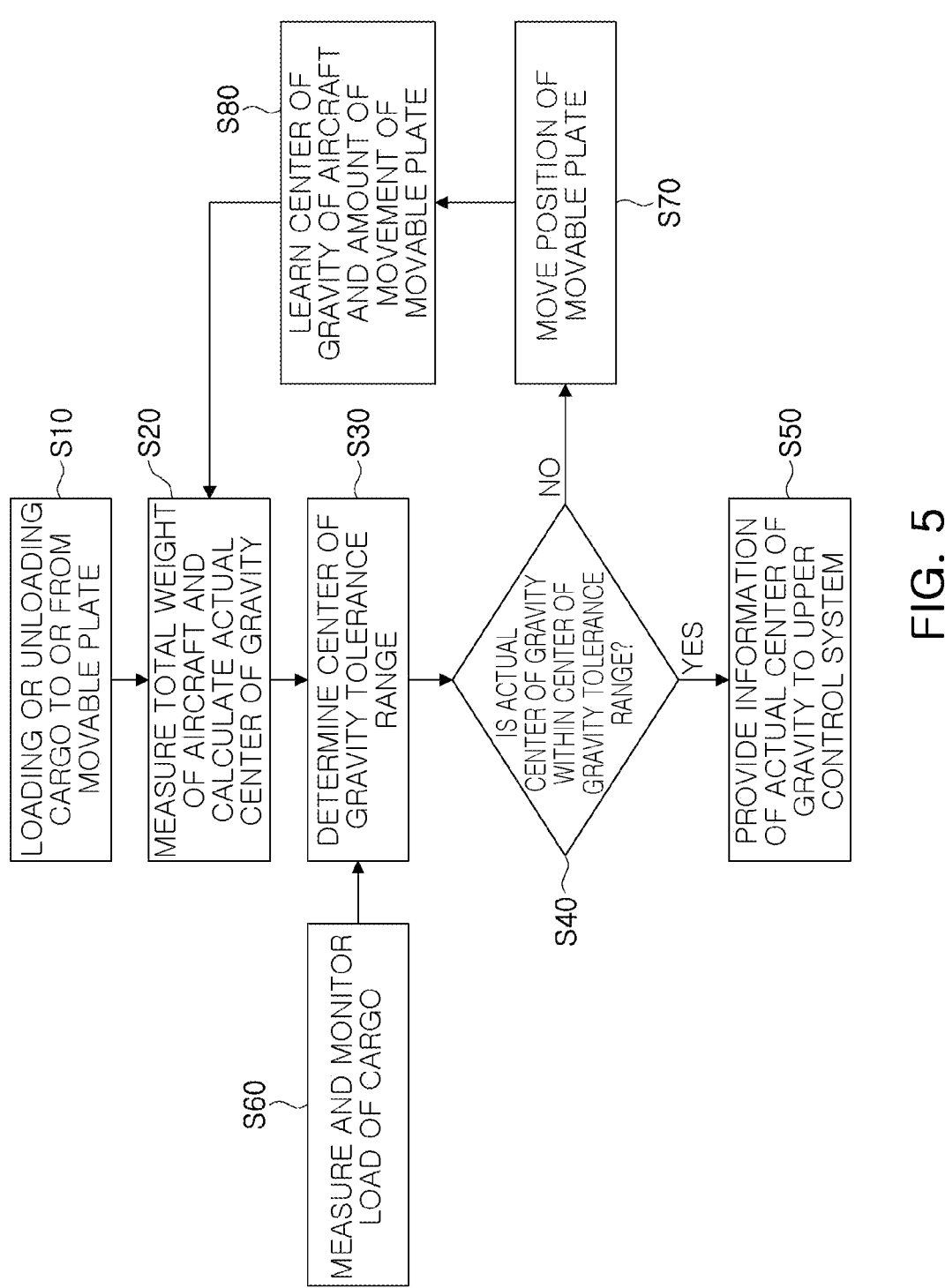
FIG. 5 is a flowchart illustrating a method for loading and unloading cargo using the device for adjusting a center of gravity according to the present disclosure.

FIG. 5 is a flowchart illustrating a method for loading and unloading cargo using a device for adjusting a center of gravity according to the present disclosure, and FIG. 6 is a view illustrating a method for loading and unloading cargo using the device for adjusting a center of gravity according to the present disclosure.

The method for loading and unloading cargo 3 according to the present disclosure may be initiated by an operation of loading cargo 3 to a movable plate 10 of a device for adjusting a center of gravity 100 in a cargo hold 2 of an aircraft 1 and/or unloading the cargo from the movable plate 10 (S10).

Figure 6A:
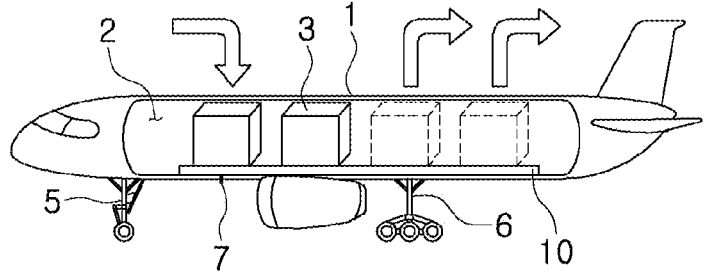
FIG. 6A and FIG. 6B are a view illustrating a method for loading and unloading cargo using the device for adjusting a center of gravity according to the present disclosure.

As illustrated in FIG. 6A, loading of the cargo 3 may be performed at a departure point or an intermediate stop of the aircraft 1. Unloading of the cargo 3 may be performed at the intermediate stop. Accordingly, the method for loading and unloading cargo 3 according to the present disclosure may be performed If the aircraft has landed on the ground at the departure point or the intermediate stop.

In this case, an air compressor for generating compressed air may be connected to an air supply unit 7 (e.g., an air supply and/or air supply control/modulator) installed on a fuselage of the aircraft 1. The air supply unit 7 may have an electric valve that can be opened and closed if electricity is applied.

If the loading of the cargo 3 is completed, the first load sensor 51 of the sensing unit 50 may measure the total weight of the aircraft 1. After the measurement or simultaneously with the measurement, the first load sensor 51 may transmit information for calculating a position of the center of gravity, that is, total weight information of the aircraft, to the controller 60.

Based on the total weight information, the controller 60 may assume density by reflecting a previously input shape of the aircraft 1 and define corresponding coordinates by calculating the center of gravity (S20).

If the loading of the cargo 3 is completed, the second load sensor 52 of the sensing unit 50 may measure and monitor the load of the cargo 3 disposed on the movable plate 10. After the measurement or simultaneously with measurement, the second load sensor 52 may transmit load information of the cargo 3 to the controller 60 (S60).

Next, the controller 60 may determine a preset center of gravity tolerance range for each aircraft with respect to the measured total weight of the aircraft 1 (S30).

The controller 60 may determine whether the actual center of gravity is within a corresponding center of gravity tolerance range by comparing the actual center of gravity and the determined center of gravity tolerance range (S40).

As a result of the determination, if the actual center of gravity is within the center of gravity tolerance range, the controller 60 may provide information of the actual center of gravity to the upper control system 70 of the aircraft 1 (S50). Then, the upper control system 70 may control the aircraft 1 to prepare for take-off and flight, and the aircraft may start the take-off.

The upper control system 70 may store various data required for calculating the center of gravity, such as the weight and the shape of the aircraft 1, the number of passengers, and the size and the number of cargo 3, as well as input or preset flight-related information, and the total weight of the aircraft, the load of the cargo 3, the center of gravity, which are calculated based on these data, and the preset center of gravity tolerance range of the total weight.

If the actual center of gravity is confirmed to deviate from the center of gravity tolerance range (e.g., if it is determined that the actual center of gravity is not within the center of gravity tolerance range), the controller 60 may calculate and determine the amount of movement of the movable plate 10 so that the actual center of gravity is moved to within the center of gravity tolerance range (e.g., based on a measured load distribution of the cargo 3).

Furthermore, the controller 60 may communicate (e.g., send a signal, a trigger, instructions, etc.) to control the electric valve of the air supply unit 7 and/or the air compressor to drive the air bearing 20 of the device for adjusting a center of gravity 100. Accordingly, air having a predetermined pressure may be sprayed from the air bearing 20, thereby floating the movable plate 10 (e.g., by a predetermined height) from the air bearing 20.

The controller 60 may also, or alternatively, drive the first driver 30 and/or the second driver 40 to move the position of the movable plate 10 by the determined amount of movement (S70).

Figure 6B:
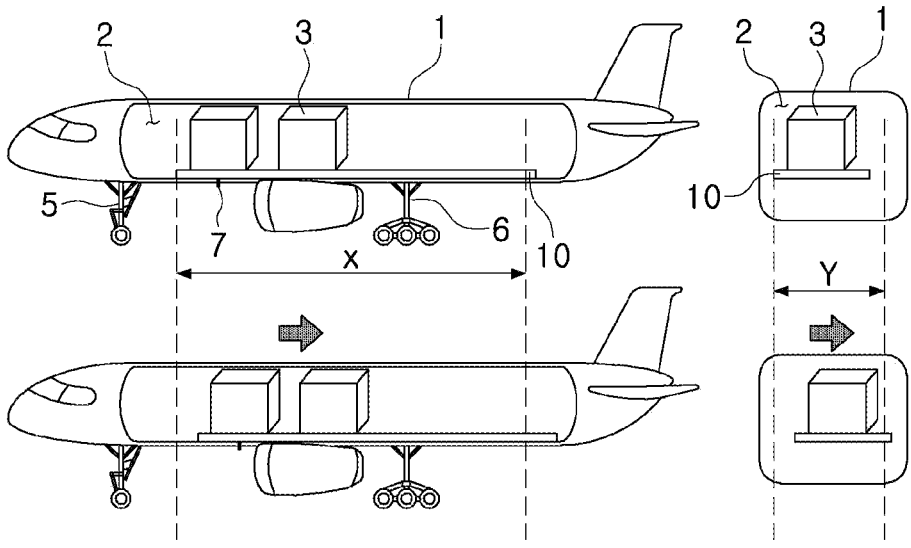

Accordingly, as illustrated in FIG. 6B, the position of the movable plate 10 may be moved in the longitudinal direction (X-direction) and/or the width direction (Y-direction) of the aircraft 1, and the position of the cargo 3 may be adjusted due to the movement of the movable plate 10.

For example, as described in FIG. 6A, after the loading of the cargo 3 is completed, 40% of the total weight of the aircraft 1 may be applied to the nose landing gear 5, and the remaining 60% of the load may be applied to the main landing gear 6.

As illustrated in FIG. 6A, after the movement of the movable plate 10 is completed, a load of half the total weight of the aircraft 1 may be distributed and applied to the nose landing gear 5 and the main landing gear 6, respectively.

In other words, the load distributed to the nose landing gear 5 and the main landing gear 6 may be changed according to the movement of the movable plate 10 and the cargo 3.

The calculated center of gravity of the aircraft 1 and/or the amount of movement of the movable plate 10 for matching the center of gravity may be repeatedly accumulated and updated (e.g., by the controller 60). Accordingly, the controller 60 may learn and/or determine the center of gravity of the aircraft 1 and/or the amount of movement (e.g., required and/or desired amount of movement to perform) of the movable plate 10 according to the load and the arrangement of the cargo 3 (S80).

The controller 60 may perform operation S20 (after and/or based on having caused the movement of the movable plate 10 and the cargo 3) of calculating the actual center of gravity, and the preceding operations may then be repeated until the actual center of gravity is in the center of gravity tolerance range.

The present disclosure provides a system and a method for loading and unloading cargo that can measure a change and distribution of a load, learn the optimal center of gravity, and ensure control stability by easily adjusting the center of gravity and maintaining balance, for example, in an aircraft.

According to the present disclosure, a system for loading and unloading cargo, in an aircraft comprising a cargo hold therein, may include: a sensing unit configured to measure a total weight of the aircraft and a load of a loaded cargo; a controller configured to calculate a center of gravity of the aircraft using information obtained by the sensing unit; and a device for adjusting a center of gravity operated under control of the controller and configured to move a position of the cargo in the cargo hold.

The device for adjusting a center of gravity may include: a movable plate configured to support the cargo, and spaced apart from a bottom and both sidewalls of the cargo hold and installed to be movable within the cargo hold; a plurality of air bearings disposed between the movable plate and the bottom to support and float the movable plate; and a driver installed in the cargo hold and connected to the movable plate, and moving the movable plate if the movable plate is floated.

The sensing unit may include: a first load sensor installed in a landing gear of the aircraft to measure the total weight of the aircraft; and a second load sensor disposed between the movable plate and a bottom of the cargo hold to measure the load of the cargo.

The second load sensor may be coupled to the air bearing.

The controller may be configured to calculate an actual center of gravity reflecting the total weight of the aircraft, determine a preset center of gravity tolerance range for the measured total weight, and determine whether the actual center of gravity is within the center of gravity tolerance range.

Based on the actual center of gravity is confirmed to deviate from the center of gravity tolerance range, the controller may drive the air bearing to float the movable plate from the air bearing by a predetermined height, and then drive the driver to move a position of the movable plate.

The controller may learn by repeatedly accumulating and updating the calculated center of gravity of the aircraft and the amount of movement of the movable plate.

A method for loading and unloading cargo may include: loading cargo to a movable plate in a cargo hold of an aircraft and/or unloading the cargo from the movable plate; when the loading of the cargo is completed, measuring a total weight of the aircraft, and calculating an actual center of gravity by reflecting total weight information; determining a preset center of gravity tolerance range for the measured total weight; comparing the actual center of gravity with the center of gravity tolerance range to determine whether the actual center of gravity is within the center of gravity tolerance range; and when the actual center of gravity is confirmed to deviate from the center of gravity tolerance range, moving a position of the movable plate.

In the moving a position of the movable plate, the movable plate may be floated by a plurality of air bearings and be then moved through a driver.

In the moving a position of the movable plate, the movable plate may be moved in at least one of a longitudinal direction and a width direction of the aircraft.

The method for loading and unloading cargo may further include measuring and monitoring a load of the cargo disposed on the movable plate, and before the moving a position of the movable plate, the amount of movement of the movable plate may be calculated by reflecting the load of the cargo.

The method for loading and unloading cargo may further include learning by repeatedly accumulating and updating the calculated center of gravity of the aircraft and the amount of movement of the movable plate.

The method for loading and unloading cargo may further include, when the actual center of gravity is within the center of gravity tolerance range, providing information of the actual center of gravity to an upper control system for flight of the aircraft.

In this manner, in the system and the method for loading and unloading cargo according to the present disclosure, even if an intermediate stop is included in the travel from a departure point to a destination, the center of gravity changed after unloading and/or loading the cargo may be quickly and easily adjusted, so that the aircraft may fly safely to the destination.

A detailed positional movement of cargo, which was conventionally difficult to perform, to adjust a center of gravity may be achieved, and the load of the cargo may be actually measured and monitored in real time.

According to the example of the present disclosure described above, in a system and a method for loading and unloading cargo, the center of gravity may be accurately adjusted by measuring the load in real time, and the movement of the movable plate through the air bearing and the driver in the cargo hold may enable a detailed adjustment of the position of the cargo.

Furthermore, according to the example of the present disclosure, a system and a method for loading and unloading cargo may quickly respond to a change in a load and the center of gravity that may occur at intermediate stops, which may make it easy to redistribute a load, and furthermore, when distributing the load, the cargo can be moved while being disposed on a movable plate, thereby securing control stability through smooth control of the center of gravity.

The aforementioned description merely illustrates the technical concept of the present disclosure, and a person skilled in the art to which the present disclosure pertains may make various modifications and modifications without departing from the essential characteristics of the present disclosure.

Therefore, the examples disclosed in this specification and drawings are not intended to limit but to explain the technical concept of the present disclosure, and the scope of the technical idea of the present disclosure is not limited by these examples. The scope of protection of the present disclosure should be interpreted by the following claims, and all technical ideas within the scope equivalent thereto should be interpreted as being included in the scope of the present disclosure.

What is claimed is:

1. A system for loading and unloading cargo, in an aircraft comprising a cargo hold, the system comprising:

a sensor configured to measure a total weight of the aircraft and a loaded cargo;

a controller configured to calculate, based on information from the sensor, a center of gravity of the aircraft; and a device configured to adjust, based on control information received from the controller, the center of gravity by moving a position of the cargo in the cargo hold, wherein the device configured to adjust the center of gravity comprises:

a movable plate configured to support and to move the cargo within the cargo hold, wherein the movable plate is spaced apart from a bottom and at least one sidewall of the cargo hold;

a plurality of air bearings, disposed between the movable plate and the bottom, configured to support and to float the movable plate; and a driver connected to the movable plate and configured to move the movable plate being floated by the plurality of air bearings, wherein the sensor comprises:

a first load sensor, connected to a landing gear of the aircraft, and configured to measure the total weight of the aircraft; and a second load sensor, between the movable plate and the bottom of the cargo hold, configured to measure a weight of the cargo, and wherein the second load sensor is coupled to an air bearing of the plurality of air bearings.

2. The system according to claim 1, wherein the controller is configured to:

calculate the center of gravity of the aircraft based on the measured total weight of the aircraft, determine a preset center of gravity tolerance range for the measured total weight, and determine whether the center of gravity is within the center of gravity tolerance range.

3. The system according to claim 2, wherein, based on a determination that the center of gravity is not within the center of gravity tolerance range, the controller is configured to:

drive the plurality of air bearings to float the movable plate from the plurality of air bearings by a predetermined height; and drive the driver to move the movable plate to a different position.

4. The system according to claim 3, wherein the controller is configured to repeatedly accumulate and update the calculated center of gravity of the aircraft and an amount of movement of the movable plate.

5. The system according to claim 1, wherein the controller is configured to control the driver to move the floated movable plate to a second position that adjusts the center of gravity to be within the center of gravity tolerance range.

6. The system according to claim 1, wherein the controller is configured to control the driver to move the floated movable plate by amount based on the measured weight of the cargo.

7. A method comprising:

receiving total weight information of an aircraft comprising a movable plate in a cargo hold of the aircraft, and calculating a center of gravity of the aircraft based on the total weight information, wherein the movable plate is configured to support and move a cargo within the cargo hold, and wherein the movable plate is spaced apart from a bottom and at least one sidewall of the cargo hold;

determining a preset center of gravity tolerance range based on a measured total weight;

measuring, by a load sensor coupled to an air bearing of a plurality of air bearings, a weight of the cargo, wherein the load sensor is disposed between the movable plate and the bottom of the cargo hold;

comparing the center of gravity with the center of gravity tolerance range to determine whether the center of gravity is within the center of gravity tolerance range; and based on determining that the center of gravity is not within the center of gravity tolerance range, causing a position of the movable plate to move by:

causing, by the plurality of air bearings, the movable plate to be floated, wherein the plurality of air bearings are disposed between the movable plate and the bottom and are configured to support the movable plate; and causing, via a driver connected to the movable plate, movement of the position of the floated movable plate.

8. The method of claim 7, wherein the causing the position of the movable plate to move comprises:

moving, by the driver, the floated movable plate to a second position that adjusts the center of gravity to be within the center of gravity tolerance range.

9. The method of claim 7, wherein the causing the position of the movable plate to move comprises causing the position of the movable plate to move in at least one of a longitudinal direction of the aircraft or a width direction of the aircraft.

10. The method of claim 7, wherein the causing the position of the movable plate to move comprises causing the position of the movable plate to move by amount based on the measured weight of the cargo.

11. The method of claim 7, further comprising performing a learning process by repeatedly accumulating and updating the calculated center of gravity of the aircraft and an amount of movement of the movable plate.

12. The method of claim 7, further comprising, based on determining that the center of gravity is within the center of gravity tolerance range, sending information indicating the center of gravity to a control system for flight of the aircraft.

13. A system for loading and unloading cargo, in an aircraft comprising a cargo hold, the system comprising:

a sensor configured to measure a total weight of the aircraft and a loaded cargo;

a controller configured to calculate, based on information from the sensor, a center of gravity of the aircraft; and a device configured to adjust, based on control information received from the controller, the center of gravity by moving a position of the cargo in the cargo hold, wherein the device configured to adjust the center of gravity comprises:

a movable plate configured to support and to move the cargo within the cargo hold, wherein the movable plate is spaced apart from a bottom and at least one sidewall of the cargo hold;

a plurality of air bearings, disposed between the movable plate and the bottom, configured to support and to float the movable plate; and a driver connected to the movable plate and configured to move the movable plate being floated by the plurality of air bearings, wherein the sensor comprises a load sensor, between the movable plate and the bottom of the cargo hold, configured to measure a weight of the cargo, and wherein the load sensor is coupled to an air bearing of the plurality of air bearings.

\* \* \* \* \*